UNITED STATES PATENT OFFICE 2,423,976

N'-BENZOYL SULFONAMIDE

Martin Everett Hultquist and Elmore Hathaway Northey, Bound Brook, N. J., assignors to American Cyanamid Company, New York, N. Y., a corporation of Maine No Drawing. Original application March 2, 1939, Serial No. 259,382. Divided and this application May 5, 1942, Serial No. 441,864

3 Claims. (Cl. 260—397.7)

This invention relates to nitro or amino substituted phenylene N'-benzoylsulfonamides and particularly N'-benzoylsulfanilamides, and to methods of preparing them.

Compounds of the present invention having the same acyl groups attached to the N' and $N^4$ nitrogen atoms of paraminoarylsulfonamides, such as sulfanilamide, may be prepared by reacting the sulfonamide with an excess of an acid chloride; by reacting the sulfonamide with an acid chloride in the presence of a tertiary base such as pyridine; by dry fusion of an acid chloride and the sulfonamide; or by reaction of an acid chloride and the sulfonamide in the presence of an inert solvent with loss of hydrochloric acid by prolonged heating. These reactions may be represented as follows, using sulfanilamide as the sulfonamide in question:

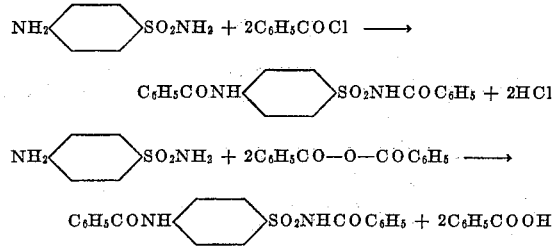

It is also possible to react an acylsulfonamide, prepared by the action of an acid chloride or anhydride on the sulfonamide, with an acylaminoarylsulfon chloride.

Unsymmetrical $N^4$ - acyl, N' - benzoylsulfonamides are prepared by reacting benzoylchloride on the corresponding $N^4$-acylsulfonamide in the presence of pyridine or by prolonged heating in an inert solvent. Benzoic acid anhydride in excess may be used in place of the acid chloride or the sodium salt of the N'-acylsulfonamide may be reacted with benzoylchloride, preferably in the presence of an inert solvent or a teritary amine. The preferred method of synthesis however, is that according to the equation, using $N^4$-acylsulfanilamide as the $N^4$ acylsulfonamide in question:

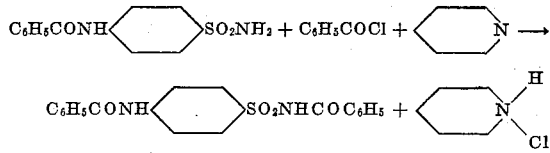

Since the free N'-benzoylsulfanilamides are usually the most effective therapeutic agents, the $N^4$-acyl-N'-benzoylsulfanilamide prepared as outlined above are hydrolyzed, preferably by boiling with aqueous sodium or potassium hydroxide. This gives the N'-sodium salt of N'-benzoylsulfanilamide which can be acidified to form the free N'-benzoylsulfanilamide.

In the above discussion of the possible alternative methods of preparing the compounds of the present invention, the preparation of paraminoarylsulfonamides only has been described. These procedures are, however, entirely general and can be applied to the preparation of other N'-benzoylsulfonamides of the present invention; i. e., by substituting metanilamide for sulfanilamide, a N'-benzoylmetanilamide may be prepared. Meta derivatives may also be prepared by reduction of N' - benzoyl meta nitroarylsulfonamides, and these preparations are also included within the scope of the present invention.

If the hydrogen of the amide nitrogen is replaced by another organic radical, for example by an alkyl group, salts are no longer formed and there is an increasing tendency for the compounds to be non-crystalline materials or oils. It is thus possible to control to a certain extent the solubility of the compounds of the present invention and by substituting an organic radical for the hydrogen, the solubility of a particular derivative may be decreased if the particular use to which it is to be put demands a relatively less soluble therapeutic agent. On the other hand, it is possible to increase the solubility of a benzoyl derivative of sulfanilamide by converting it to the $N^4$-formaldehyde-sulfoxylate derivative, and making the neutral sodium salt thereof. These derivatives exhibit high surface activity.

The benzoylsulfanilamide of the present invention shows activity against pneumococcal and streptococcal infections.

The invention will be described in greater detail in conjunction with the following specific examples which are illustrative only and not intended to limit the scope of the invention. The parts are by weight.

Example 1

N'-benzoyl-$N^4$-acetylsulfanilamide

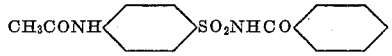

214 grams of dry $N^4$-acetylsulfanilamide (1 mol), 141 grams of benzoyl chloride (1 mol), and 700 cc. of toluene were mixed and heated under a reflux condenser for 20 hours. There was a slow evolution of hydrochloric acid in the condenser during this time. Most of the toluene was then evaporated and the residue was dissolved in about a liter of water with sodium hydroxide to about pH 9. The solution was treated with decolorizing carbon, and some acetylsulfanilamide removed. It was then acidified, the crude product filtered off and washed well with alcohol to remove any benzoic acid. It was then digested with hot alcohol in which it is very slightly soluble, filtered and recrystallized from 80% Cellosolve in which it is about 2% soluble. Assay by sodium hydroxide 99.3% calculated for molecular weight of 318.3. Melting point was 280°–285° C. with decomposition. Crystallized as needles.

N'-benzoyl-$N^4$-acetylsulfanilamide was also made by the fusion of equal molecular amounts of N'-sodium $N^4$-acetylsulfanilamide and benzoyl chloride in the absence of solvent. This gave slightly better yields than the above method. It was also made by reaction of benzoyl chloride on $N^4$-acetylsulfanilamide in aqueous solution with addition of sodium hydroxide. The crude product was purified as above.

*Example 2*

N'-benzoylsulfanilamide

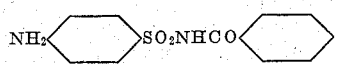

N'-benzoyl-$N^4$-acetylsulfanilamide was hydrolyzed by boiling with dilute caustic soda solution. On cooling the alkaline solution, long needle-like crystals separated which were filtered off and washed slightly. On drying at 100° C., these analyzed for N'-sodium-N'-benzoylsulfanilamide, calculated for molecular weight of 298.3. Titration with sodium nitrite showed 299.

N'-benzoylsulfanilamide was prepared from the sodium salt by dissolving in water and acidifying. A recovery from the hydrolysis of mother liquor was also obtained by acidifying. The crude product was washed well with benzene to remove any benzoic acid, and then recrystallized twice from 60% alcohol using decolorizing carbon. The product crystallized as hectagonal prisms analyzing 99.8% pure by sodium hydroxide and 100.6% by sodium nitrite titration, calculated for theoretical molecular weight of 276.3. Melting point was 181.2°–182.3° C.

*Example 3*

N'-methyl-N'-benzoyl-$N^4$-acetylsulfanilamide

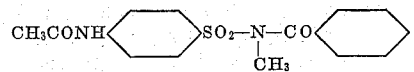

To 106 grams (0.464 moles) N'-methyl-$N^4$-acetylsulfanilamide in 100 cc. of dry pyridine was added 42 grams (0.3 mole) benzoyl chloride. The temperature rose to 80° C. and a dark red-brown solution resulted. This was heated to 95°–100° C. for 30 minutes during which process the solution became lighter.

The syrupy solution was drowned in 300 cc. water and this was acidified to methyl red. The oily later partly crystallized to a sticky mass. This was separated and dissolved in 300 cc. alcohol, clarified, treated with caustic to make the solution alkaline to benzoazurine and the solution was cooled. On standing and dilution with water, the product crystallized out. This was recrystallized twice more from dilute alcohol to give colorless prisms and plates, melting at 230°–233° C.

In the examples, $N^4$-acetylsulfanilamide has been used in each case as the starting material because it is cheap and readily available. It should be understood, however, that the invention is not limited to the use of $N^4$-acetylsulfanilamide and any other acyl derivative such as formyl, propionyl, benzoyl, and the like, may be substituted for the acetyl derivative.

In the claims, the term "acyl" is used in its ordinary restricted meaning of the radical of the acidic portion of an organic carboxylic acid

It should be understood that it is used in the claims and in the specification in this ordinary restricted meaning and has no broader meaning.

This application is a division of our copending application Serial No. 259,382, filed March 2, 1939.

We claim:

1. A N'-benzoylsulfonamide having the formula:

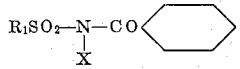

in which $R_1$ is a member of the group consisting of p-amino and p-acylamino substituted phenylene and X is a member of the group consisting of hydrogen and a metallic ion.

2. A N'-benzoylsulfanilamide having the formula:

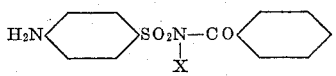

in which X is a member of the group consisting of hydrogen and a metallic ion.

3. N'-benzoylsulfanilamide.

MARTIN EVERETT HULTQUIST.
ELMORE HATHAWAY NORTHEY.